3,397,988
PHOTOGRAPHIC MATERIAL

August Jean Van Paesschen, Hove, and Marcel Nicolas Vrancken, Berchem-Antwerp, Belgium, assignors to Gevaert Photo-Producten N.V., Mortsel-Antwerp, Belgium, a Belgian company
No Drawing. Filed Jan. 24, 1964, Ser. No. 339,877
Claims priority, application Belgium, Jan. 25, 1963, 42,286
7 Claims. (Cl. 96—114)

This invention relates to a photographic material having improved characteristics.

Up to now gelatin still is the usual binder for all kinds of light-sensitive and non-light-sensitive layers in most of the photographic materials. After drying, however, gelatin layers generally become somewhat brittle, and the photographic material undergoes some dimensional alterations as well. These alterations are not merely due to dilation or shrinkage of the support, but also to stresses in the gelatin layer.

At present substances are still sought for which render photographic layers mainly consisting of gelatin less brittle, and which procure a higher dimensional stability to the photographic material and also decrease its curling tendency. First, these substances should be compatible with gelatin and with photographic emulsions. Further, they should not impair the optical properties of the photographic layers and they should be completely inert to light-sensitive compounds, dyes, sensitizing agents, etc.

These conditions are satisfied to a large extent by mixing the gelatin of a photographic material with determined amounts of certain latices.

In addition to gelatin, a photographic material according to the invention contains in at least one of its layers a copolymer formed by copolymerization in aqueous emulsion of butadiene and a lower ester of acrylic or methacrylic acid.

The copolymer of butadiene and the lower ester of acrylic or methacrylic acid is added as a latex to a light-sensitive gelatin silver halide emulsion, or to the coating composition of gelatin-containing non-light-sensitive photographic layers such as protective layers, back layers, antihalation layers, filter layers, subbing layers, baryta coatings, layers containing development nuclei or other layers of an image-receiving material suited for the production of images according to the silver complex diffusion transfer process, etc.

The latex is prepared by emulsion copolymerization of the monomers. If the amount of latex is increased with respect to the amount of gelatin, then the obtained gelatin-latex layer conformably will turn more hydrophobic. The maximum amount of added latex is approximately 80%, but preferably 40% or otherwise less copolymer is used. These amounts are calculated on the total amount of gelatin and copolymer.

The plasticizing properties of the copolymer in gelatin layers are closely connected with the nature of the recurring units that built up the copolymer. For being able to used as a plasticizer for gelatin, a copolymer e.g. of butadiene and methyl methacrylate must not contain more than 70 to 80% of methyl methacrylate units. Nonetheless, this maximum amount may be increased yet if the copolymer comprises acrylate units in lieu of methacrylate units. Moreover, it was stated that the copolymer should contain at least 20% of acrylate or methacrylate units in order to obtain a latex forming a clear layer, when mixed with gelatin.

This way, the copolymer may contain approximately 20 to 80% of methyl methacrylate units if a copoly(butadiene/methyl methacrylate) is used. If more than 80% of methyl methacrylate would be present in the copolymer, the coated gelatin-latex layer would become too brittle, and if less than 20% of methyl methacrylate would be present in the copolymer, the layer would be less clear and of less stability. These limits are varying, of course, if other esters of acrylic or methacrylic acid are copolymerized with butadiene.

Although the description and the examples are aiming at the copolymerization of butaidene and esters of acrylic or methacrylic acid, it is obvious that other dienes e.g. isoprene and chloroprene can be substituted entirely or partially for butadiene in the copolymerization. Moreover, at most 5% of the ester of acrylic or methacrylic acid may be replaced by a hydrophilic monomeric compound e.g. by acrylic acid, methacrylic acid, a half-ester of maleic acid, vinylpyrrolidone, etc.

The latex is formed by emulsion polymerization of butadiene and a lower ester of acrylic or methacrylic acid in the required proportions. This emulsion polymerization may occur continuously or discontinuously. In the continuous copolymerization the monomers are continuously mixed in the required proportions and dispersed in water, to which emulsifying agents, initiating agents, etc. have been added. The mixture is then further conducted through several reaction areas.

In the discontinuous copolymerization the monomers are dispersed by one or more additions in water, to which emulsifying and polymerization-initiating agents have been added. The copolymerization is performed in only one reaction area. The total concentration of the monomers amounts to approximately 40%, but with some combinations of emulsifying agents the concentration of the monomers may amount to 50 to 55%, without impairing the stability of the emulsion. In order to attain some particular effects e.g. a particular clearness of the gelatin-latex layer, the concentration may be decreased to 20% and even to 10%.

The polymerization is initiated and performed while thoroughly stirring the reaction mixture at 50 to 80° C. The polymerization may also be performed at lower temperature and, in practice, the so-called redox-initiating agents may then be employed.

As an initiating system, water-soluble or water-insoluble initiating agents, or ultraviolet light may be used. It is obvious that also combinations of 2 or more of these initiating systems may be applied.

Examples of water-soluble initiating agents are hydrogen peroxide, potassium persulphate, butylhydroperoxide, methylethylketone peroxide, and $\alpha,\alpha'$-azo-bis-($\alpha$-methyl-$\gamma$-carboxybutyronitrile). Water-insoluble initiating agents are e.g. $\alpha,\alpha'$-azo-isobutyronitrile, and peroxides such as benzoyl peroxide.

For the copolymerization, the monomers are dispersed in water by means of an emulsifying agent or by means of combinations of two or more emulsifying agents. As possible emulsifying agents are considered:

(a) Anionic emulsifying agents

Soaps (salts of fatty acids),
Salts of acid sulphuric acid esters (sulphates), such as:
    Primary alkyl sulphates,
    Secondary alkyl sulphates,
    Sulphated esters of fatty acids with polyalcohols,
    Sulphated fatty acid alkanolic amides, and
    Sulphated polyglycolether derivatives;
Salts of sulphonic acids (sulphonates), such as:
    Alkyl sulphonates,
    Condensation products of fatty acids with hydroxy-alkanesulphonic acids,
    Condensation products of fatty acids with amino-alkanesulphonic acids;
Salts of alkylsulphopolycarboxylic acid esters,
Alkylaryl sulphonates such as:

Alkylbenzene sulphonates,
Alkylphenolpolyglycolether sulphonates, and
Alkylbenzimidazole sulphonates, and
Salts of organic phosphoric acid esters.

(b) Non-ionic emulsifying agents

Fatty acid esters of polyalcohols,
Fatty acid alkanolamides,
Addition products of ethylene oxide (care should be taken that the number of recurring ethylene oxide in the polyethylene oxide chain remains less than 8 to 9 since, otherwise, the emulsifying agent is not photographically inert anymore) such as:
   Polyglycol esters of fatty acids,
   Polyglycol ethers of acyl amides and of fatty acid alkanol amides,
Polyglycol ethers of alkyl aromatic compounds, and
Addition products of propylene oxide and ethylene oxide.

The formed latex is added to the chemically ripened gelatin silver halide emulsion or, in the case of non-light-sensitive layers, to the coating composition of this layer in proportions with respect to the gelatin as indicated above.

The description, examples and claims of the present invention are fully aiming at the mixing of latices of butadiene-copolymers with gelatin. It was stated, however, that certain combinations of emulsifying agents enable the formation of latices, which are compatible with other binding agents too, e.g. with polyvinyl alcohol, and which also manifest a plasticizing influence on layers formed from these binders. Accordingly such latices of butadiene-copolymers may be successfuly used in layers comprising these binders e.g. polyvinyl alcohol.

The following examples illustrate the invention. The parts stated in these examples are parts by weight.

EXAMPLE 1

60 parts of water (distilled under nitrogen atmosphere) are placed in a pressure tube of 200 ccs. and, thereupon 2 parts of a 40% aqueous paste of the sodium salt of oleylmethyl tauride, and 0.8 part of sodium lauryl sulphate are dissolved therein.

To this solution are added:

| | Parts |
|---|---|
| Buffering solution 1 | 0.5 |
| Buffering solution 2 | 0.5 |
| Hydrogen peroxide (30% solution) | 1 |
| Methyl methacrylate (distilled under nitrogen atmosphere) | 20 |
| Butadiene | 20 |

The buffering solution 1 is a 2.95% aqueous solution of disodium hydrogen phosphate, whereas the buffering solution 2 is a 2.83% aqueous solution of potassium dihydrogen phosphate. Some butadiene is evaporated for expelling the atmospheric oxygen from the pressure tube. After closing, the pressure tube is shaken for a while in order to mix the ingredients and, subsequently, the mixture is polymerized for 5 h. while rotating the pressure tube in a bath of 70° C.

The yield is quantitative. The resulting 40% latex hardly contains any coagulate and it remains unaltered after shaking for 24 h.

First of all this resulting latex is examined as to the clarity of layers formed from an aqueous gelatin solution, to which latex has been added.

A layer is therefore coated pro rata of 90 g. per sq. m. from a mixture of gelatin and latex, whereto 0.1 part of the sodium salt of oleylmethyl tauride is added yet. The proportion of solid substance in the mixture gelatin/latex is 1:1.

For comparison, a pure gelatin layer of the same thickness is chosen. The dullness of this layer is measured by a photodensitometer. For a layer in wet condition these measurements yield $N=4$ and for a dried layer $D=4$ resp. For a latex layer these values are $N=31$ and $D=4$ respectively.

For comparison, the clearness of layers of gelatin mixed with equal amounts of two other commercially available latices is measured analogously:

Gelatin with copoly(ethyl acrylate/vinylisobutyl ether/styrene/acrylic acid) (66/20/12/2): $N=51$, $D=22$
Gelatin with copoly(butadieneacrylonitrile) (67/33): $N=56$, $D=6$.

250 ccs. of the resulting latex are added to 1 kg. of a 10% aqueous gelatin solution. This gelatin-latex mixture is applied pro rata of 25 g. per sq. m. to both sides of a 0.1 mm. thick support of stretched polyethylene terephthalate, which on both sides is provided with a suited subbing layer. Then the dimension alterations of the resulting film material are measured after transition from conditions with 30% relative humidity to conditions with 60% relative humidity. This material is compared with an analogous material. The 25 g. of solid substance per sq. m., however, consist of pure gelatin:

Dimensional alterations after a transition of 30% relative humidity to 60% relative humidity

| | Percent |
|---|---|
| Film with pure gelatin | 0.090 |
| Film with gelatin and latex | 0.035 |

EXAMPLE 2

In a pressure tube of 200 ccs. are successively placed:

60 parts of water (distilled under nitrogen atmosphere)
2.7 parts of a 30% aqueous solution of the compound having the formula

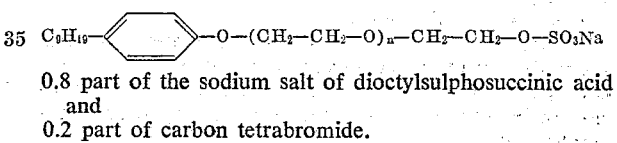

0.8 part of the sodium salt of dioctylsulphosuccinic acid and
0.2 part of carbon tetrabromide.

To the resulting solution are added:

| | Parts |
|---|---|
| Buffering solution 1 of Example 1 | 1 |
| Buffering solution 2 of Example 1 | 1 |
| Hydrogen peroxide (30% solution) | 1 |
| Methyl methacrylate (distilled under nitrogen atmosphere) | 24 |
| Butadiene | 16 |

The oxygen is removed from the pressure tube analogously to the method in Example 1, whereupon the tube is closed and the mixture polymerized.

A stable 40% latex with little coagulate is obtained and the same measurements as to the clarity are carried out as described in Example 1. The obtained values are $N=11$ and $D=4$ respectively.

Analogous results are obtained, when measuring dimensional alterations of a gelatin-latex layer with varying relative humidity as described in Example 1.

EXAMPLE 3

In a pressure tube of 200 ccs. are placed successively:

| | Parts |
|---|---|
| Water (distilled under nitrogen atmosphere) | 60 |
| Saponine | 2.4 |

The resulting solution is brought to pH 8 by means of sodium bicarbonate and, thereupon, the following mixture is added:

| | Parts |
|---|---|
| Azo-isobutyronitrile | 0.2 |
| Methyl methacrylate (distilled under nitrogen atmosphere) | 20 |
| Butadiene | 20 |

The polymerization is performed analogously to the method of Example 1. After reaction the resulting latex is filtered, whereby approximately 2 parts of the coagulate are eliminated.

When carrying out the measurements as to the clarity of gelatin-latex layers as described in Example 1, the values $N=20$ and $D=4$ are obtained.

EXAMPLE 4

In a reaction flask of 200 ccs. are placed successively:

60 parts of water (distilled under nitrogen atmosphere),
2.7 parts of a 30% aqueous solution of the compound having the formula:

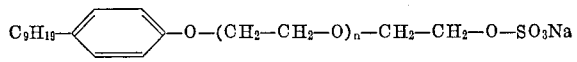

0.8 part of the sodium salt of dioctylsulphosuccinic acid,
1 cc. of the buffering solution 1 of Example 1,
1 cc. of the buffering solution 2 of Example 1,
0.2 part of benzoyl peroxide,
20 parts of methyl methacrylate, and
20 parts of butadiene.

The polymerization is performed as in Example 1.

When performing the measurements as to the clarity of gelatin-latex layers as described in Example 1, the values $N=29$ and $D=4$ are obtained.

EXAMPLE 5

In a reaction flask of 200 ccs. are placed successively:

60 parts of water.
0.8 part of octylphenoxyethoxyethyl sodium sulphonate,
0.8 part of a mixture of compounds having the formula:

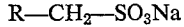

wherein R represents a saturated or unsaturated hydrocarbon radical having 14 to 18 carbon atoms,
0.2 part of the sodium salt of $\alpha,\alpha'$-azo-bis($\alpha$-methyl-$\gamma$-carboxybutyronitrile),
20 parts of methyl methacrylate, and
20 parts of butadiene.

The polymerization is carried out as in Example 1.

When performing the measurements as to the clarity of gelatin-latex layers as described in Example 1, the values $N=14$ and $D=4$ are obtained.

EXAMPLE 6

In a pressure tube of 200 ccs. are placed successively:

| | Parts |
|---|---|
| Water | 60 |
| 40% aqueous paste of the sodium salt of oleylmethyl tauride | 2 |
| Octylphenoxyethyl sodium sulphonate | 0.8 |
| Sodium acrylate | 0.5 |
| Hydrogen peroxide (30% solution) | 1 |
| Butadiene | 20 |
| Methyl methacrylate | 20 |

The polymerization is carried out as described in Example 1.

When measuring the clarity of the layers obtained as described in Example 1, the values $N=35$ and $D=5$ are obtained.

EXAMPLE 7

In a pressure tube of 200 ccs. are placed successively:

| | Parts |
|---|---|
| Water | 80 |
| 40% aqueous paste of the sodium salt of oleylmethyl tauride | 1 |
| Sodium salt of heptadecenylbenzimidazolodisulphonic acid | 0.4 |

The resulting solution is brought at pH 8 by means of sodium bicarbonate. The following products are then added:

| | Parts |
|---|---|
| Hydrogen peroxide (30%) | 0.5 |
| Butyl acrylate | 10 |
| Butadiene | 10 |

The polymerization is carried out as described in Example 1.

Measurements as to the clarity of the obtained layers carried out as described in Example 1 yield the values $N=12$ and $D=3$.

EXAMPLE 8

To 1 kg. of a gelatin silver bromide emulsion containing ⅙ mole of silver bromide and 70 g. of gelatin are added 30 ccs. of a 40% latex of a copolymer of methyl methacrylate and different amounts of butadiene.

On a paper support of 125 g./sq. m. provided with a usual baryta layer is coated a thin layer of the gelatin-latex mixture in such a way, that approximately 8 g. of gelatin are present per sq. m. After gelling and drying, the material is cut in strips of 0.5 cm. A part of these strips is exposed, developed, fixed, rinsed, high-glossed, and together with untreated strips conditioned at 20° C. and 30% of relative humidity. Then the strips are pulled under weight load with their emulsion side turned outwards over a roller having a diameter of 1 cm. This bending brings about little cracks in the emulsion layer. In the following table, comparative values for materials with or without latex are stated.

| | Number of cracks per running cm. | |
|---|---|---|
| | Untreated material | After treatment and high-glossing |
| (1) Comparison, without latex | 5 | 18 |
| (2) Gelatin + 16% of latex of copoly(butadiene/ methyl methacrylate) (25/75) | 6 | 5 |
| (3) Gelatin + 16% of latex of copoly(butadiene/ methyl methacrylate) (50/50) | 2 | 0 |

EXAMPLE 9

100 ccs. of a 10% aqueous gelatin solution are admixed with 10 ccs. of a 40% latex of copoly(butadiene/methyl methacrylate) of Example 3. This mixture is coated on a glass plate treated previously in such a way that the gelatin-latex layer upon drying can be easily stripped off. After setting and drying at room temperature, the gelatin-latex layer having a thickness of approximatively 150µ is stripped off and cut in strips of 15 mm. width. The number of folding movements before rupture with a "M.I.T. Fold Tester" at 30% of relative humidity and 20° C. runs to 18. If a comparison material without latex is subjected to the same test, the number of folding movements amounts to merely 7.

EXAMPLE 10

A baryta composition is prepared as follows:

| | | |
|---|---|---|
| Barium sulphate | g | 1200 |
| Water | ccs | 400 |
| Gelatin | g | 30 |
| 40% aqueous latex prepared as described in Example 3 | g | 75 |
| 20% aqueous formaldehyde solution | cc | 1 |

To this dispersion are added the usual ingredients, such as colour improvers.

The baryta composition is applied to a photographic paper in one or more layers pro rata of 5 to 3 g./sq. m. of the layer. After drying, a photographic gelatin silver halide emulsion layer is applied according to known methods on top of the baryta layer(s).

Compared with a photographic paper bearing a baryta layer without latex, the resulting photographic material manifests a considerable improvement as to the curling effect and the brittleness. It is characterized by a lower water absorption as well.

What we claim is:

1. Photographic material comprising a support and at least one layer thereon, said layer containing as binder material a mixture consisting essentially of gelatin and a latex of a copolymer of butadiene and a lower ester of acrylic or methacrylic acid, water, and an anionic or nonionic emulsifying agent, the amount of said co-polymer being not greater than about 80% by weight of said binder mixture.

2. The photographic material of claim 1 wherein said binder mixture contains at least 20% by weight of said co-polymer.

3. The photographic material of claim 1 wherein said layer is a light-sensitive silver halide emulsion layer containing said binder mixture.

4. The photographic material of claim 1 wherein said layer is a backing layer for said support.

5. The photographic material of claim 1 adapted for use as an image-receiving material for the production of images according to the silver complex diffusion transfer process and wherein said layer contains diffusion transfer development nuclei.

6. The photographic material of claim 1 wherein said co-polymer is of butadiene and methyl methacrylate.

7. The photographic material of claim 6 wherein said co-polymer contains 20–80% of methyl methacrylate units.

References Cited

UNITED STATES PATENTS

| 2,543,181 | 2/1951 | Land | 96—29 |
| 2,808,388 | 10/1957 | Hellmann | 96—114 X |
| 3,142,568 | 7/1964 | Nottorf | 96—114 X |
| 3,203,804 | 8/1965 | Cohen et al. | 96—114 |

NORMAN G. TORCHIN, *Primary Examiner.*

R. H. SMITH, *Assistant Examiner.*